(12) United States Patent
Ishikawa et al.

(10) Patent No.: US 11,161,310 B2
(45) Date of Patent: Nov. 2, 2021

(54) HEAT-CAULKING DEVICE

(71) Applicant: HONDA MOTOR CO., LTD., Tokyo (JP)

(72) Inventors: Hiroshi Ishikawa, Tochigi-ken (JP); Yoshinori Tsurugai, Tochigi-ken (JP); Yuichi Tajiri, Tochigi-ken (JP); Shigeto Akahori, Tochigi-ken (JP); Naohiro Ohtsu, Tochigi-ken (JP); Satoshi Shiozaki, Tochigi-ken (JP); Shinzo Urushidani, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 107 days.

(21) Appl. No.: 16/498,469

(22) PCT Filed: Mar. 30, 2018

(86) PCT No.: PCT/JP2018/013649
§ 371 (c)(1),
(2) Date: Sep. 27, 2019

(87) PCT Pub. No.: WO2018/181910
PCT Pub. Date: Oct. 4, 2018

(65) Prior Publication Data
US 2021/0107234 A1    Apr. 15, 2021

(30) Foreign Application Priority Data

Mar. 31, 2017  (JP) .............................. JP2017-069719

(51) Int. Cl.
| B29C 65/22 | (2006.01) |
| B29C 65/30 | (2006.01) |
| B29C 65/00 | (2006.01) |

(52) U.S. Cl.
CPC .......... *B29C 65/226* (2013.01); *B29C 65/224* (2013.01); *B29C 65/30* (2013.01); *B29C 66/612* (2013.01); *B29C 66/73921* (2013.01)

(58) Field of Classification Search
CPC ..... B29C 65/224; B29C 65/226; B29C 65/30; B29C 65/38; B29C 66/301; B29C 66/606;
(Continued)

(56) References Cited

U.S. PATENT DOCUMENTS 10,369,749 B2 *  8/2019  Tsurugai ................. B29C 65/30
10,864,683 B2 * 12/2020  Tsurugai ............... B29C 65/606
(Continued)

FOREIGN PATENT DOCUMENTS

| JP | 2007-307812 | 11/2007 |
| WO | 2017/047786 | 3/2017 |

OTHER PUBLICATIONS

International Search Report and Written Opinion for International Application No. PCT/JP2018/013649 dated May 22, 2018, 6 pages.

*Primary Examiner* — George R Koch
(74) *Attorney, Agent, or Firm* — Amin, Turocy & Watson, LLP

(57) ABSTRACT

This heat-caulking device is inserted into one or more holes penetrating a main plate having a substantially conical hollow portion, whereby one or more bosses of a blade protruding from an inner peripheral surface of the main plate toward the hollow portion are melted so as to join the main plate and the blade. A heat chip of the heat-caulking device has a substantially conical hollow main body portion, an outer peripheral surface of which conforms to the inner peripheral surface of the main plate. On the outer peripheral surface of the main body portion, a convex portion protruding toward the vicinity of the holes of the inner peripheral surface of the main plate is provided.

8 Claims, 11 Drawing Sheets

(58) Field of Classification Search
CPC ............ B29C 66/612; B29C 66/73921; B29C 66/81425; B29C 66/8322; B29C 66/83221
See application file for complete search history.

(56) References Cited

U.S. PATENT DOCUMENTS

2019/0022954 A1* 1/2019 Tsurugai ............ B29C 66/8322
2019/0084248 A1  3/2019 Tsurugai et al.

* cited by examiner

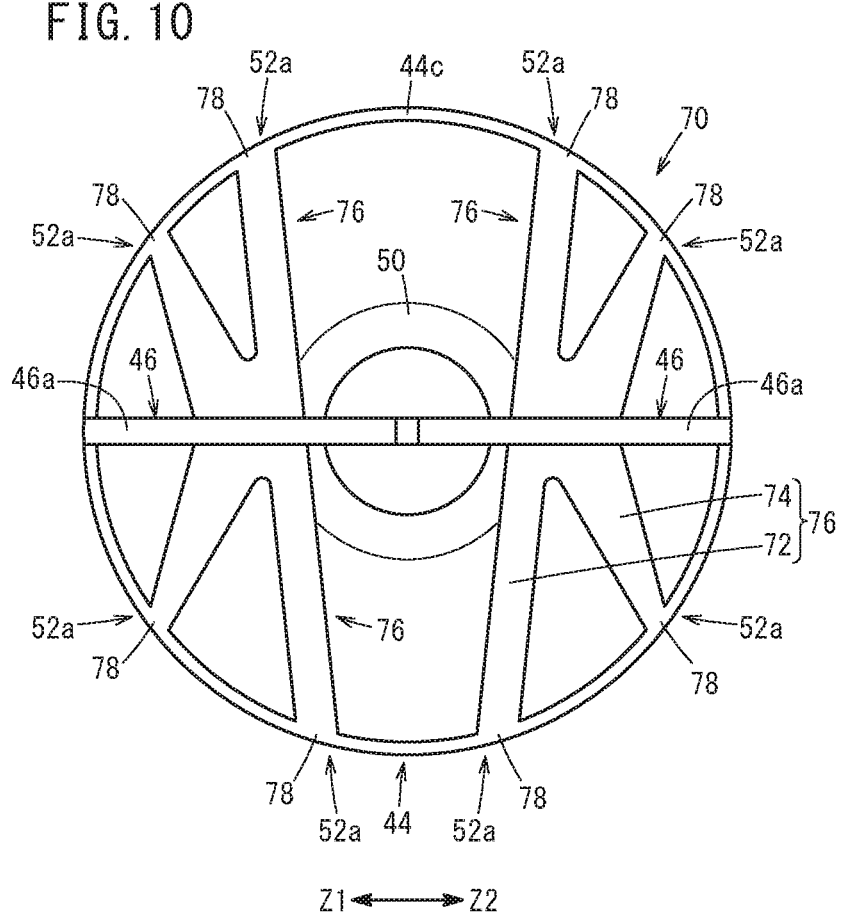

HEAT-CAULKING DEVICE

This application is a 371 of PCT/JP2018/013649, filing date Mar. 30, 2018.

TECHNICAL FIELD

The present invention relates to a heat caulking device for joining a first member and a second member in such a manner that a boss of the second member that has been inserted in a hole of the first member is melted to join the first member and the second member.

BACKGROUND ART

As disclosed in, for example, Japanese Laid-Open Patent Publication No. 2007-307812, there is known a heat caulking device for joining a first member and a second member in such a manner that a boss of the second member that has been inserted in a hole of the first member is pressed on by a heat chip that has generated heat due to electrification, whereby the melted boss is expanded and deformed to join the first member and the second member.

SUMMARY OF INVENTION

In this kind of heat caulking device, it is conceivable that in the case where, for example, a first member having a substantially conical hollow section and a second member having a boss that projects from an inner peripheral surface of the first member toward the hollow section are joined, the heat chip is configured to be substantially conical. As a result, an outer peripheral surface of the heat chip can be easily conformed to the inner peripheral surface of the first member, so heat can be favorably transmitted to the boss between these so as to favorably melt and deform the boss. That is, it becomes possible for the first member and the second member to be easily joined.

However, if, as described above, the heat chip is configured to be substantially conical, then its peripheral length on one end surface side thereof becomes longer than its peripheral length on another end surface side thereof. Therefore, during electrification, a current path on the one end surface side of the heat chip becomes longer than a current path on its other end surface side. As a result, a generated heat amount on the one end surface side of the heat chip becomes smaller compared to a generated heat amount on its other end surface side, so it gets difficult for the whole of the boss to be evenly melted, and there is consequently concern that joining strength of the first member and the second member lowers.

The present invention was made in order to solve the above-described problem, and provides a heat caulking device that enables a first member and a second member to be easily and highly strongly joined using a substantially conical heat chip.

In order to achieve the above-described object, the present invention is a heat caulking device for joining a first member and a second member in such a manner that one or more bosses of the second member that, by being inserted in one or more holes penetrating the first member having a substantially conical hollow section, project from an inner peripheral surface of said first member toward the hollow section, are melted to join the first member and the second member, the heat caulking device comprising a heat chip that includes a substantially conical hollow main body section whose outer peripheral surface conforms to the inner peripheral surface of the first member, the outer peripheral surface of the main body section being provided with a projection that projects toward a vicinity of the hole of the inner peripheral surface of the first member.

In this heat caulking device, the outer peripheral surface of the main body section is conformed to the inner peripheral surface of the first member, whereby the projection provided on the outer peripheral surface of said main body section can be easily disposed in a vicinity of the boss projecting from the hole of the first member. Therefore, by the heat chip having its temperature raised due to, for example, the likes of electrification, direct heating, and induction heating, heat can be transmitted efficiently to the boss via the projection. In other words, the whole of the boss can be favorably melted and deformed.

Incidentally, it is conceivable that in order to improve joining strength of the first member and the second member, volume of the boss is increased so as to enlarge a thickness of a melted deformed section, for example. In this case, in a general heat chip, it gets more difficult for heat to be transmitted to the whole of the boss to melt and deform the boss, proportionately to the volume of the boss increasing. If, in order to deal with this, the heat chip has its temperature raised to a temperature enabling the whole of the boss to be melted, then it results in the first member and a portion other than the boss of the second member also being excessively heated, and there ends up being concern that quality of a joined member obtained by joining the first member and the second member lowers.

However, due to this heat caulking device, the vicinity of the boss can be intensively heated via the projection as described above, even when the volume of the boss has been increased. Therefore, the whole of the boss can be favorably melted and deformed, and it can be avoided that a portion other than the boss is excessively heated.

As is clear from the above, this heat caulking device results in that, even using the heat chip having the substantially conical main body section in order that the first member and the second member are easily joined, the boss can be effectively melted and deformed due to the projection provided on the outer peripheral surface of said main body section, so the first member and the second member can be highly strongly joined. Moreover, it is also possible for the thickness of the melted deformed section to be increased so as to achieve a further improvement in joining strength, without lowering quality of a joined article.

Moreover, the present invention is a heat caulking device for joining a first member and a second member in such a manner that one or more bosses of the second member that, by being inserted in one or more holes penetrating (an inner peripheral surface of) the first member having a substantially conical hollow section, project from an inner peripheral surface of said first member toward the hollow section, are melted to join the first member and the second member, the heat caulking device comprising a heat chip that includes: a substantially conical hollow main body section whose peripheral length on one end surface side thereof is larger than its peripheral length on another end surface side thereof and whose outer peripheral surface conforms to the inner peripheral surface of the first member; a pair of terminal sections that project from an inner peripheral surface of the main body section toward an axial center of said main body section so as to face each other; and a connecting section that electrically connects the terminal section and an edge section on the one end surface side of the main body section.

This heat caulking device is provided with the connecting section that electrically connects the edge section on the one end surface side where the peripheral length is larger compared to on the other end surface side of the main body section, and the terminal section. Therefore, when the heat chip has been electrified via the terminal section, the one end surface side of the main body section, as well as being supplied with a current via said terminal section, is supplied with a current also via the connecting section. As a result, in the case of both the one end surface side and the other end surface side of the main body section that have a peripheral length difference, occurrence of a difference in length of a current path during electrification can be suppressed. That is, occurrence of a difference in generated heat amount between the one end surface side and the other end surface side of the main body section can be suppressed.

As is clear from the above, this heat caulking device, by being provided with the connecting section as described above, makes it possible for heat to be generated substantially evenly in the whole of the heat chip having the substantially conical main body section. Hence, even using the heat chip having the substantially conical main body section in order that the first member and the second member are easily joined, the whole of the boss can be favorably melted and deformed, so the first member and the second member can be highly strongly joined.

In the above-described heat caulking device, it is preferable that the outer peripheral surface of the main body section is provided with a projection that projects toward a vicinity of the hole of the inner peripheral surface of the first member. In this case, as described above, heat can be generated substantially evenly in the whole of the heat chip due to the connecting section, and the boss can be intensively heated due to the projection. This makes it possible for the whole of the boss to be even more favorably melted and deformed, and for the first member and the second member to thereby be easily and highly strongly joined.

In the above-described heat caulking device, it is preferable that the projection has a projecting strip shape extending along a space between the one end surface side and the other end surface side of the main body section, and that an intersection point of the edge section on the one end surface side of the main body section and the connecting section is provided in a vicinity of an end section on the one end surface side of the projection. When the heat chip has been electrified, a resistance value gets smaller in the projection proportionately to the thickness being larger there compared to in another region of the heat chip, so it is easy for the generated heat amount to be reduced. By disposition of the intersection point with respect to this projection being set as described above, it becomes possible for a current to be effectively supplied to the projection via the connecting section. Therefore, occurrence of a difference in generated heat amount between the projection and another region whose thickness is smaller than that of said projection can be suppressed, so that heat can be generated substantially evenly in the whole of the heat chip. This makes it possible for the whole of the boss to be favorably melted and deformed, and for the first member and the second member to thereby be more highly strongly joined.

In the above-described heat caulking device, it is preferable that a plurality of the holes are provided so as to be lined up at intervals in a circumferential direction, and that the projection projects toward a space between of the holes. In this case, a plurality of the bosses can each be effectively melted and deformed at one time, and moreover the whole of those plurality of bosses can each be effectively melted and deformed. Hence, even, for example, a joined article including a plurality of the second members can be efficiently obtained since the plurality of second members can be joined at one time to the first member. Moreover, in the case where, for example, one second member has been provided with a plurality of the bosses, joining strength can be even more favorably improved, without joining efficiency of the first member and the second member being lowered.

In the above-described heat caulking device, it is preferable that the hole extends in a spiral from a center side in a radial direction of the first member, and that the projection extends along an extending direction of the hole, along a space between said holes. Even in the case of a boss inserted in the hole in this way, the whole of said boss can be favorably melted and deformed due to the heat chip provided with the projection as described above, so a joined article excelling in joining strength can be efficiently obtained.

Due to the present invention, the whole of the boss can be favorably melted and deformed using the substantially conical heat chip, so the first member and the second member can be easily and highly strongly joined.

BRIEF DESCRIPTION OF DRAWINGS

FIG. 10 is a plan view of a one end surface side of the heat chip of FIG. 9.

DESCRIPTION OF EMBODIMENTS

A preferred embodiment of a heat caulking device according to the present invention will be presented and described in detail with reference to the accompanying drawings.

Figure 1:
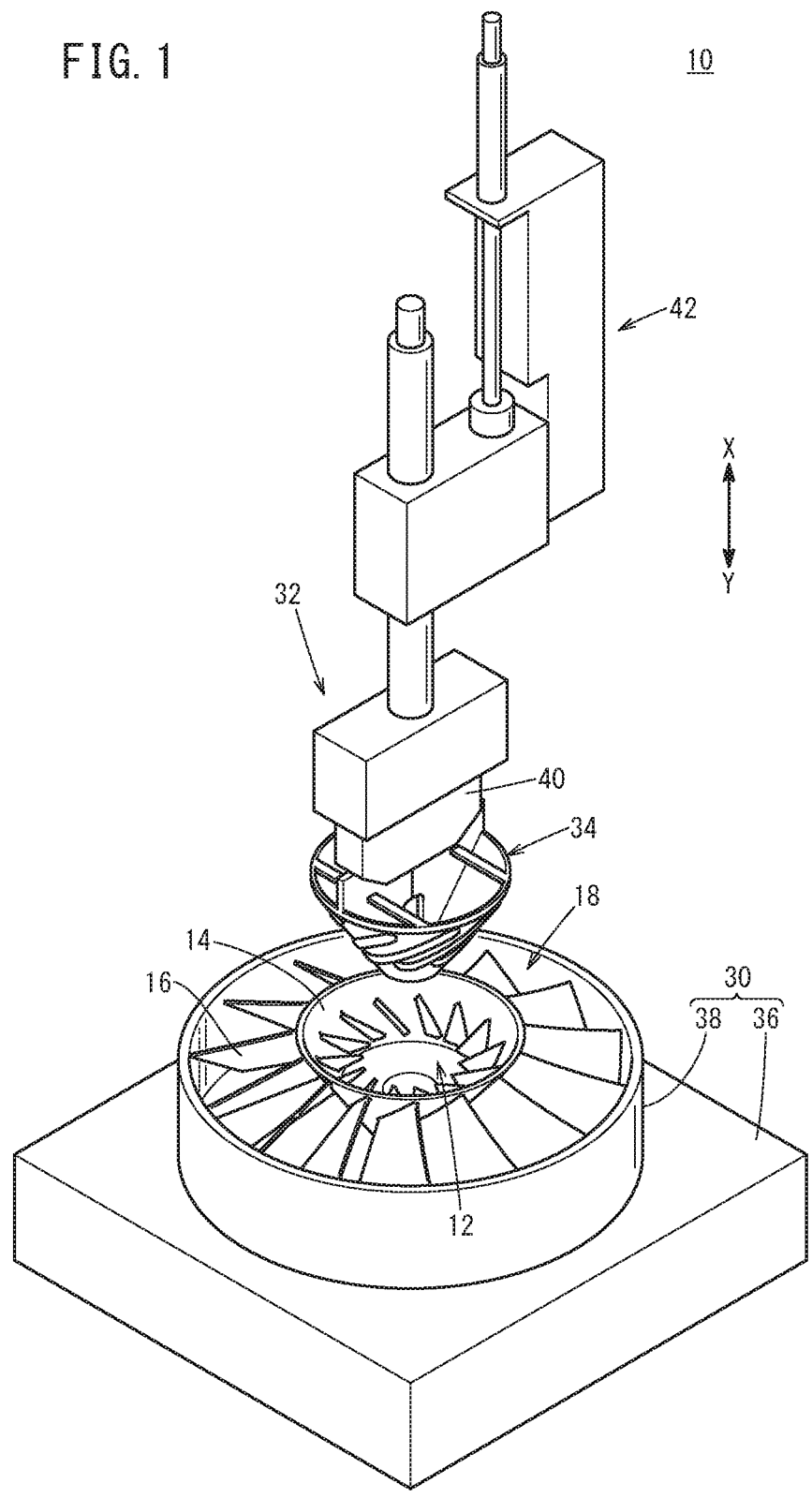
FIG. 1 is a perspective view of a heat caulking device according to an embodiment of the present invention, and a first member and a second member before joining by heat caulking.
Figure 2:
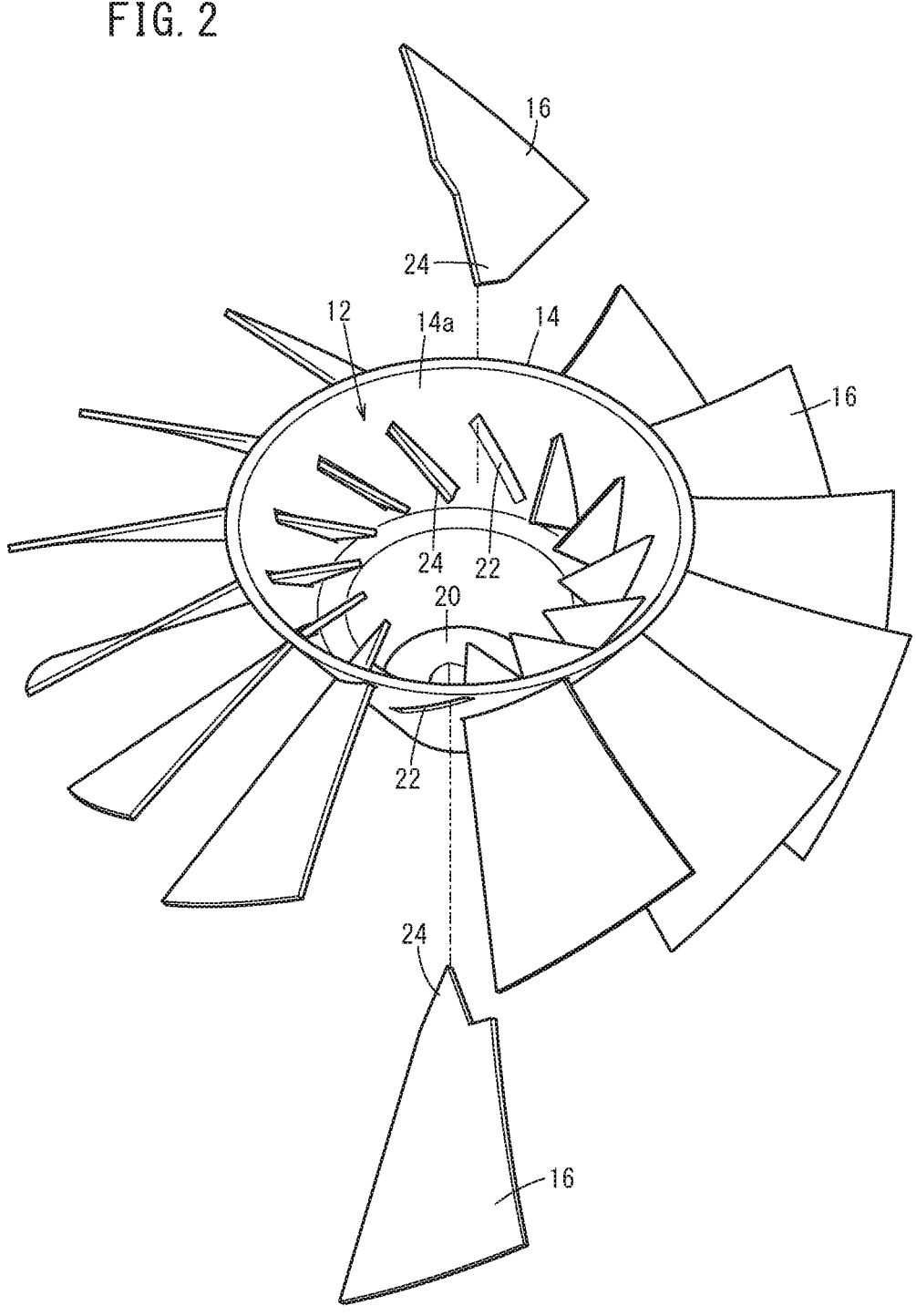
FIG. 2 is a perspective view of a main plate and blades before joining by heat caulking.
Figure 3:
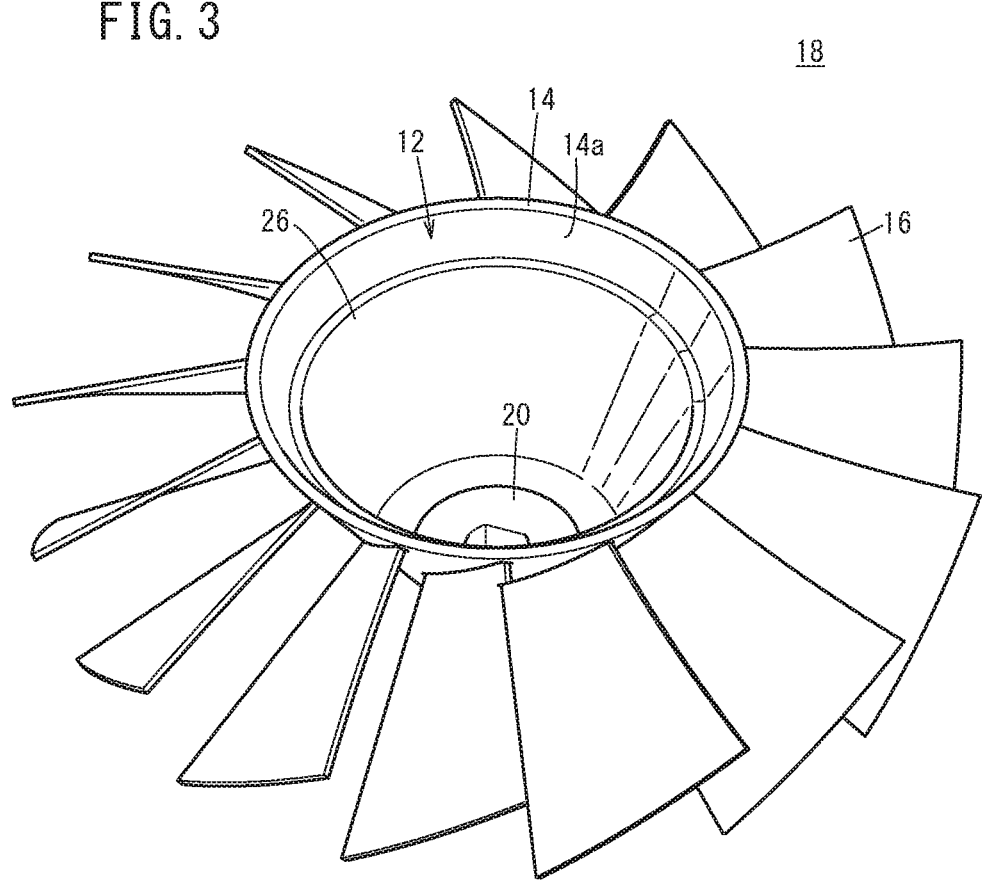
FIG. 3 is a perspective view of an impeller obtained by joining the main plate and the blades by heat caulking.

As shown in FIGS. 1-4, the present embodiment describes an example in which, by means of a heat caulking device 10 (refer to FIG. 1), a first member configured from a main plate 14 having a substantially conical (a substantially truncated cone shaped) hollow section 12 and a second member configured from a plurality of blades 16 are joined by heat caulking to obtain a joined body being an impeller 18 (refer to FIG. 3).

However, the joined body obtained by applying the heat caulking device 10 is not limited to the impeller 18. That is, the first member need only include the substantially conical hollow section 12, and other shapes or applications, and so on, are not specifically limited. Moreover, the second member need only include one or more bosses 24 that, by being inserted in one or more holes 22 (refer to FIG. 2) provided in the first member, project from an inner peripheral surface of said first member toward the hollow section 12, and other shapes, applications, numbers of items, and so on, are not specifically limited. Furthermore, a configuration may be adopted in which the boss 24 of the second member is inserted in the hole 22 of the first member by the first member and the second member being integrated and bent so as to approach each other, and so on.

The main plate 14 is configured from a thermoplastic resin such as polypropylene (PP), for example, and has a hollow substantially truncated cone shape whose peripheral length on one end surface side (an arrow direction X side of FIG. 1) is larger compared to its peripheral length on another end surface side (an arrow direction Y side of FIG. 1). That is, an external form of the main plate 14 has a taper whose diameter decreases from the one end surface side to the other end surface side. The one end surface side of the main plate 14 is open, and, as shown in FIG. 4, its other end surface side is provided with a disk section 25 having formed therein a through-hole 25a in which a rotating shaft (not illustrated) is inserted.

Figure 4:
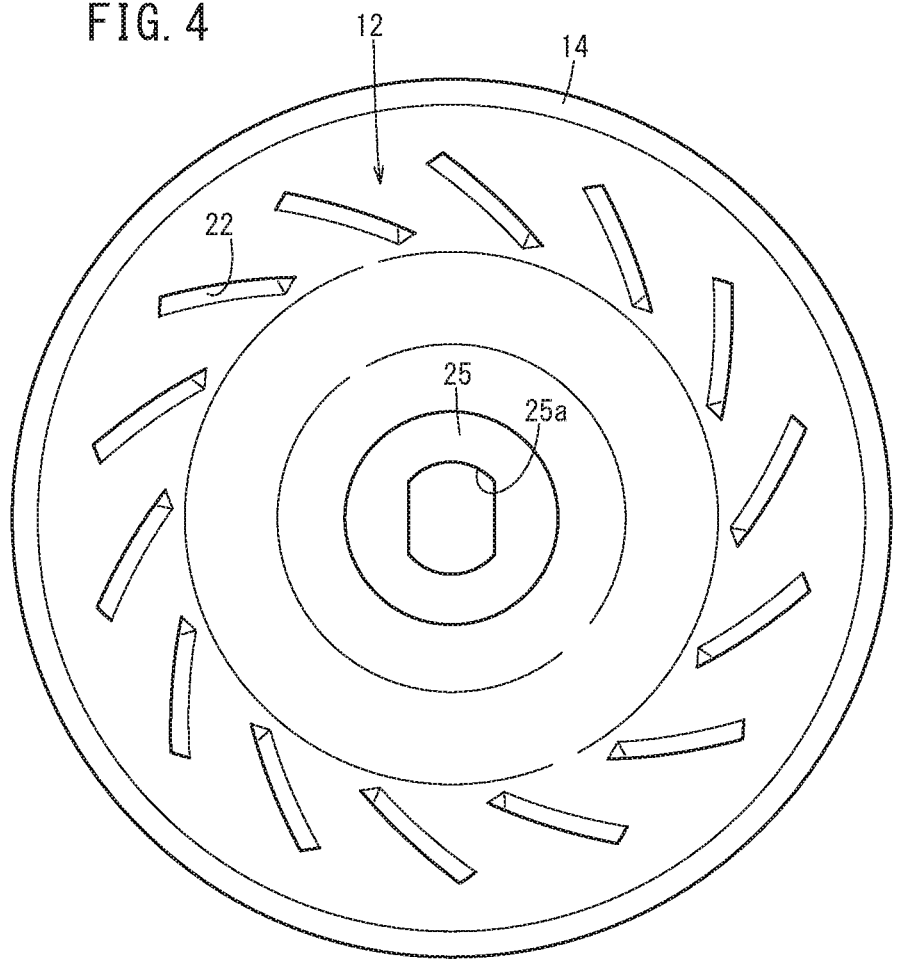
FIG. 4 is a plan view of one end surface side of the main plate.

Moreover, as shown in FIGS. 2 and 4, the main plate 14 is provided with a plurality of the holes 22. Each of the holes 22 penetrates a peripheral wall of the main plate 14 to communicate the hollow section 12 and an outside. Moreover, these holes 22 are provided so as to extend in a spiral from substantially a center section in a radial direction of the main plate 14, and in such a manner that said holes 22 are lined up at a certain interval in a circumferential direction of the main plate 14.

There are the same number of blades 16 as there are holes 22 of the main plate 14, and each of these blades 16 includes the boss 24 that is fitted into said hole 22. In the present embodiment, the boss 24 has a substantially triangular plate shape projecting from a main body of the blade 16.

In a state where each of the holes 22 of the main plate 14 has been fitted with the boss 24 of the blade 16, whereby said boss 24 is projected from the inner peripheral surface of the main plate 14 toward the hollow section 12, the boss 24 is melted and thereby deformed, by the heat caulking device 10, as will be mentioned later. This makes it possible to obtain the impeller 18 that has had the main plate 14 and the blades 16 joined via a melted deformed section 26 formed by a plurality of the bosses 24 (refer to FIG. 2) deforming so as to be annularly continuous, as shown in FIG. 3.

As shown in FIG. 1, the heat caulking device 10 includes a holding stand 30, a power feeding drive section 32, and a heat chip 34. The holding stand 30 includes: a base 36; and a cylindrical section 38 disposed on an upper surface of the base 36, and enables the main plate 14 fitted with the blades 16 to be held on an inside of the cylindrical section 38. The power feeding drive section 32 includes: an electrode 40 connected to a power supply (not illustrated); and a drive mechanism 42 that moves said electrode 40 in a direction of approaching and separating from the holding stand 30.

Figure 5:
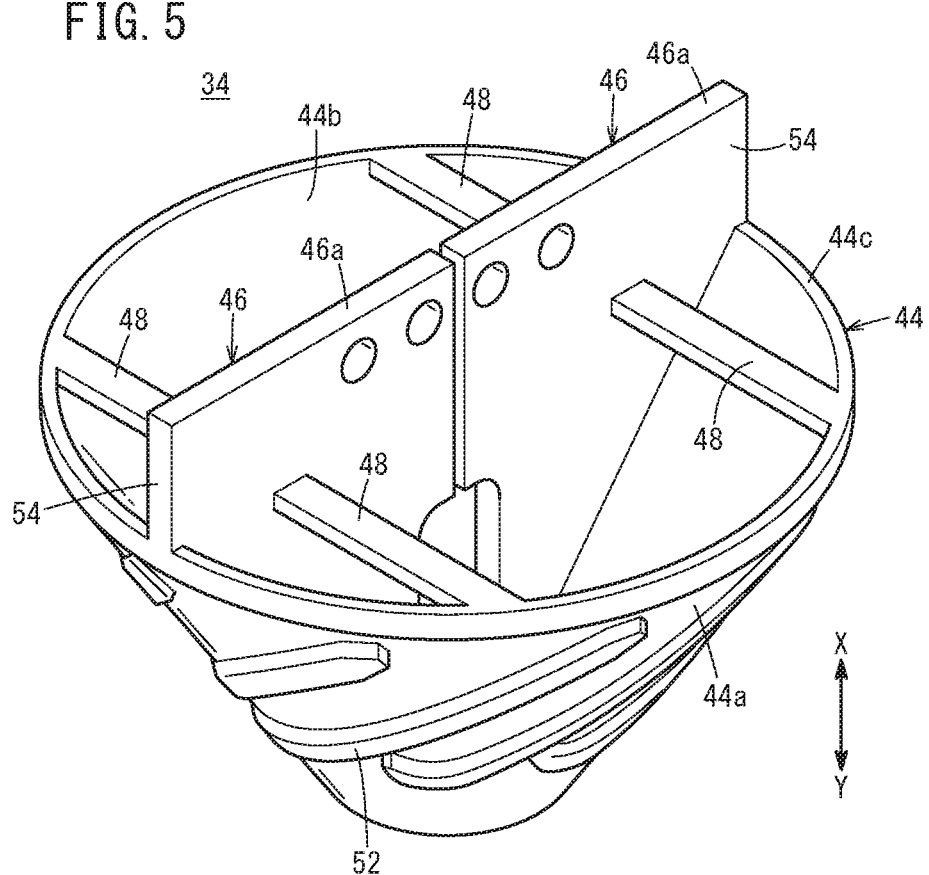
FIG. 5 is a perspective view of a heat chip provided in the heat caulking device of FIG. 1.

As shown in FIG. 5, the heat chip 34 is configured from a material that generates heat due to electrification such as steel, for example, and includes a main body section 44, a terminal section 46, and a connecting section 48. As will be mentioned later, the heat chip 34 is inserted in the hollow section 12 of the main plate 14, when the main plate 14 and the blades 16 are joined by heat caulking.

The main body section 44 has a hollow substantially truncated cone shape formed such that when the heat chip 34 has been inserted in the hollow section 12, an outer peripheral surface 44a of said main body section 44 conforms to an inner peripheral surface 14a of the main plate 14. That is, an external form of the main body section 44 has a taper whose diameter decreases from the one end surface side (an arrow direction X side of FIG. 5) to the other end surface side (an arrow direction Y side of FIG. 5), and a peripheral length of the one end surface side of said main body section 44 is larger compared to a peripheral length on its other end surface side.

Figure 6:
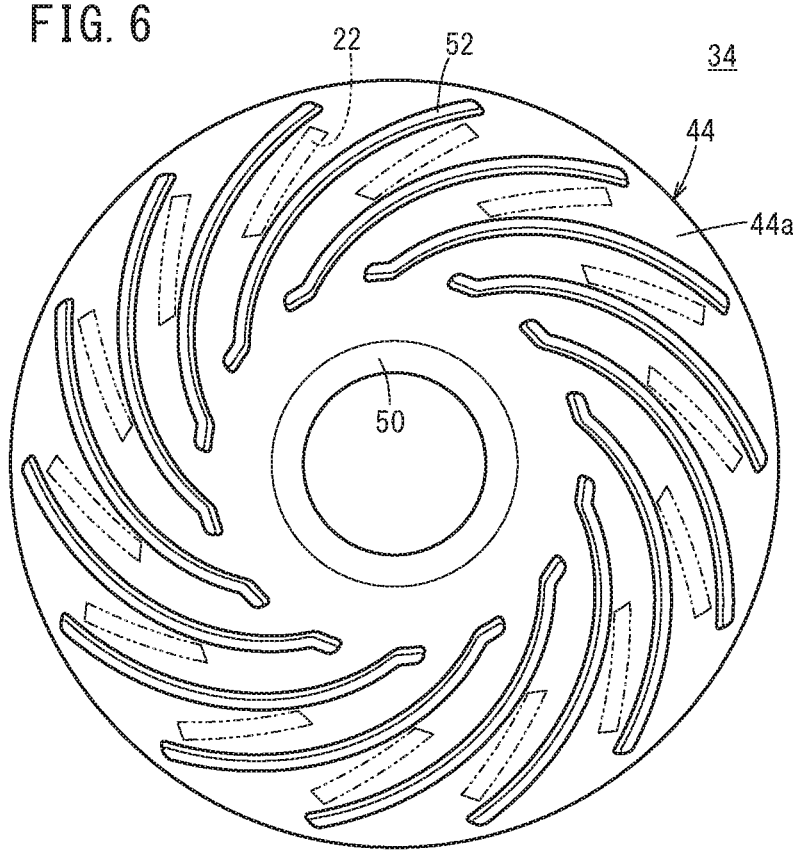
FIG. 6 is a plan view of another end surface side of the heat chip of FIG. 5.

Moreover, as shown in FIG. 6, the one end surface side of the main body section 44 is open, and its other end surface side is provided with an annular section 50 that projects toward an axial center of the main body section 44. The outer peripheral surface 44a of the main body section 44 is provided with a plurality of projections 52 that project toward vicinities of the holes 22 of the inner peripheral surface 14a of the main plate 14.

In the present embodiment, the projection 52 is a projecting strip that extends longer than the hole 22 does, along an extending direction of said hole 22, along a space between adjacent ones of said holes 22. Note that in FIG. 6, positions of the holes 22 facing the outer peripheral surface 44a of the main body section 44 at a time when the heat chip 34 has been inserted in the hollow section 12 of the main plate 14, are shown by imaginary lines.

As shown in FIG. 5, the terminal section 46 is configured from a pair thereof that project from an inner peripheral surface 44b of the main body section 44 toward the axial center of said main body section 44 so as to face each other. Each of the terminal sections 46 is plate-like, with a planar direction of its principal plane conforming to an axial direction (an arrows XY direction of FIG. 5) of the main body section 44. Moreover, one end section of the terminal section 46 projecting from one end surface of the main body section 44 configures a mounting section 54. The heat chip 34 is configured capable of being mounted on the electrode 40 via this mounting section 54.

The connecting section 48 electrically connects each of the pair of terminal sections 46 and an edge section 44c on the one end surface side of the main body section 44. In the present embodiment, the connecting section 48 is bar shaped, and, when seen in planar view from the one end surface side of the main body section 44, extends linearly to both end sides in the radial direction of the main body section 44 from the terminal section 46, along a direction orthogonal to a longitudinal direction of an end surface 46a of said terminal section 46.

The heat caulking device 10 according to the present embodiment is basically configured as above. Next, steps for obtaining the impeller 18 by joining the main plate 14 and the blades 16 using the heat caulking device 10, will be described with further reference to FIG. 7.

First, the main plate 14 fitted with the blades 16 is set on an inside of the cylindrical section 38 of the holding stand 30. At this time, an opening on the one end surface side of the main plate 14 is faced onto the heat chip 34 mounted on the electrode 40 of the power feeding drive section 32.

Next, the heat chip 34 is electrified by the power feeding drive section 32 via the electrode 40, and heat is generated in said heat chip 34. As described above, the heat chip 34 is provided with the connecting section 48 that electrically connects the edge section 44c on the one end surface side where the peripheral length is longer compared to a peripheral length on the other end surface side of the main body section 44, and the terminal section 46.

Therefore, the one end surface side of the main body section 44, as well as being supplied with a current via the terminal section 46, is supplied with a current also via the connecting section 48. As a result, in the case of both the one end surface side and the other end surface side of the main body section 44 that have a peripheral length difference, occurrence of a difference in length of a current path during electrification can be suppressed. That is, occurrence of a difference in generated heat amount between the one end surface side and the other end surface side of the main body section 44 can be suppressed.

By the heat chip 34 caused to generate heat in this way being brought close to the holding stand 30 by the drive mechanism 42, the outer peripheral surface 44a of the main body section 44 of said heat chip 34 can be abutted on all of the bosses 24 projecting from the inner peripheral surface 14a of the main plate 14. As a result, heat of the heat chip 34 is transmitted to each of the bosses 24, so the plurality of bosses 24 can be melted and deformed at one time.

Figure 7:
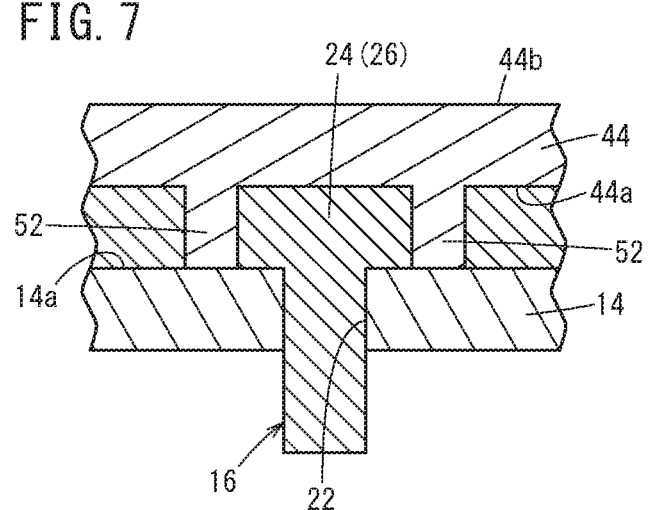
FIG. 7 is an explanatory drawing for explaining disposition of a projection of the heat chip of FIG. 5 and the main plate and blade, during heat caulking.

At this time, as shown in FIGS. 6 and 7, the projection 52 provided on the outer peripheral surface 44a of the main body section 44 is disposed in the vicinity of the boss 24. Specifically, the projection 52 can be disposed with respect to the boss 24 in such a manner that the boss 24 is sandwiched by projections 52 from both sides in the circumferential direction of the main plate 14. As a result, heat can be efficiently transmitted to each of the bosses 24 via the projections 52. That is, the plurality of bosses 24 can each be effectively melted and deformed at one time, and moreover the whole of those plurality of bosses 24 can each be effectively melted and deformed.

As a result, the plurality of bosses 24 are deformed so as to be annularly continuous and the melted deformed section 26 is formed, between the outer peripheral surface 44a of the main body section 44 and the inner peripheral surface 14a of the main plate 14, after which the heat chip 34 is separated from the holding stand 30 by the drive mechanism 42. Then, the melted deformed section 26 is solidified, whereby the impeller 18 that has had the plurality of blades 16 joined to the main plate 14 by heat caulking, can be obtained.

As may be understood from the above, in the heat caulking device 10 according to the present embodiment, the main body section 44 is formed in a substantially truncated cone shape as described above, so that, when the heat chip 34 is inserted in the hollow section 12 of the main plate 14, the outer peripheral surface 44a of said main body section 44 can be easily conformed to the inner peripheral surface 14a of the main plate 14. As a result, the plurality of bosses 24 projecting from the inner peripheral surface 14a of the main plate 14 toward the hollow section 12 can be contacted at one time by the outer peripheral surface 44a of the main body section 44, whereby heat of said outer peripheral surface 44a can be favorably transmitted to them.

Moreover, since even though the main body section 44 is configured to have a substantially truncated cone shape, occurrence of a difference in generated heat amount between the one end surface side and the other end surface side of the main body section 44 can be suppressed by the connecting section 48 as described above, heat can be generated substantially evenly in the whole of said main body section 44. In addition, the boss 24 can be effectively heated by the projection 52 provided on the outer peripheral surface 44a of the main body section 44. As a result, the whole of the boss 24 can be favorably melted and deformed, thereby making it possible for the main plate 14 and the blades 16 to be highly strongly joined.

Furthermore, the vicinity of the boss 24 can be intensively heated via the projection 52 as described above, even when volume of the boss 24 has been increased in order to improve joining strength of the main plate 14 and the blades 16. In other words, since the whole of the boss 24 can be favorably melted and deformed without the whole of the heat chip 34 having its temperature raised, it can be avoided that a portion other than the boss 24 is excessively heated. As a result, it is possible for thickness of the melted deformed section 26 to be increased so as to achieve a further improvement in joining strength of the main plate 14 and the blades 16, without lowering quality of the impeller 18.

The present invention is not limited to the above-described embodiment, and may be variously modified in a range not departing from the spirit of the present invention.

The heat chip 34 of the heat caulking device 10 may include connecting sections 60, 62, 64, 66 according to modified examples respectively shown in FIGS. 8A-8D, instead of the above-described connecting section 48. Note that configuring elements displaying functions and advantages the same as or similar to those of the configuring elements shown in FIGS. 1 and 5-7, of the configuring elements shown in FIGS. 8A-8D will be assigned with the same reference symbols as in FIGS. 1 and 5-7, and detailed descriptions thereof will be omitted. The connecting sections 60, 62, 64, 66 each electrically connect each of the pair of terminal sections 46 and the edge section 44c on the one end surface side of the main body section 44.

Figure 8A:
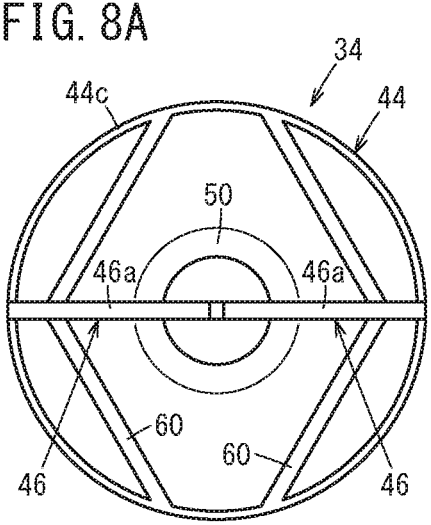
FIGS. 8A, 8B, 8C, and 8D are each a plan view of a one end surface side of a heat chip according to a modified example.

Specifically, as shown in FIG. 8A, the connecting section 60 is bar shaped, and, when seen in planar view from the one end surface side of the main body section 44, extends in a direction inclining with respect to the longitudinal direction of the end surface 46a of the terminal section 46, in such a manner that the connecting section 60 approaches an axial center side of the main body section 44 as a point on the connecting section 60 goes from the terminal section 46 to the edge section 44c on the one end surface side of said main body section 44.

Figure 8C:
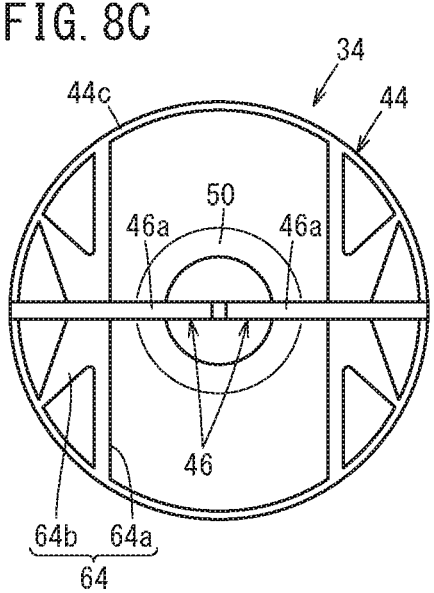
Figure 8B:
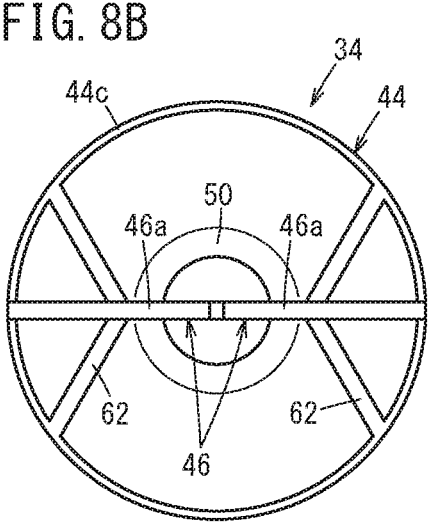

As shown in FIG. 8B, the connecting section 62 is bar shaped, and, when seen in planar view from the one end surface side of the main body section 44, extends in a direction inclining with respect to the longitudinal direction of the end surface 46a of the terminal section 46, in such a manner that the connecting section 62 separates from the axial center side of the main body section 44 as a point on the connecting section 62 goes from the terminal section 46 to the edge section on the one end surface side of said main body section 44.

As shown in FIG. 8C, the connecting section 64 is configured from a main section 64a and a branch section 64b that are each bar shaped. When seen in planar view from the one end surface side of the main body section 44, the main section 64a extends linearly to both end sides in the radial direction of the main body section 44 from the terminal section 46, along a direction orthogonal to the longitudinal direction of the end surface 46a of said terminal section 46. The branch section 64b extends in a direction inclining with respect to the longitudinal direction of the end surface 46a of the terminal section 46, from said terminal section 46, further to an outer side in the radial direction of the main body section 44 than where the main section 64a is.

Figure 8D:
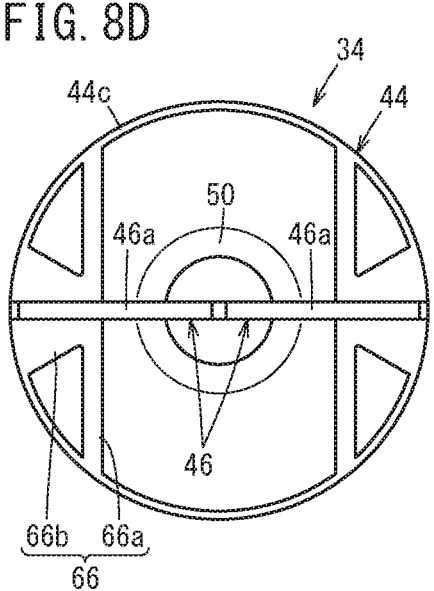

As shown in FIG. 8D, the connecting section 66 is configured from a main section 66a and a branch section 66b that are each bar shaped. When seen in planar view from the one end surface side of the main body section 44, the main section 66a extends linearly to both end sides in the radial direction of the main body section 44 from the terminal section 46, along a direction orthogonal to the longitudinal direction of the end surface 46a of said terminal section 46. The branch section 66b is provided along the terminal section 46 in such a manner that its area when seen in the previously described planar view increases from the main section 66a to the outer side in the radial direction of the main body section 44.

Even when these connecting sections 60, 62, 64, 66 are provided, it becomes possible for heat to be generated substantially evenly in the whole of the main body section 44 of the heat chip 34, similarly to when the connecting section 48 is provided.

Figure 9:
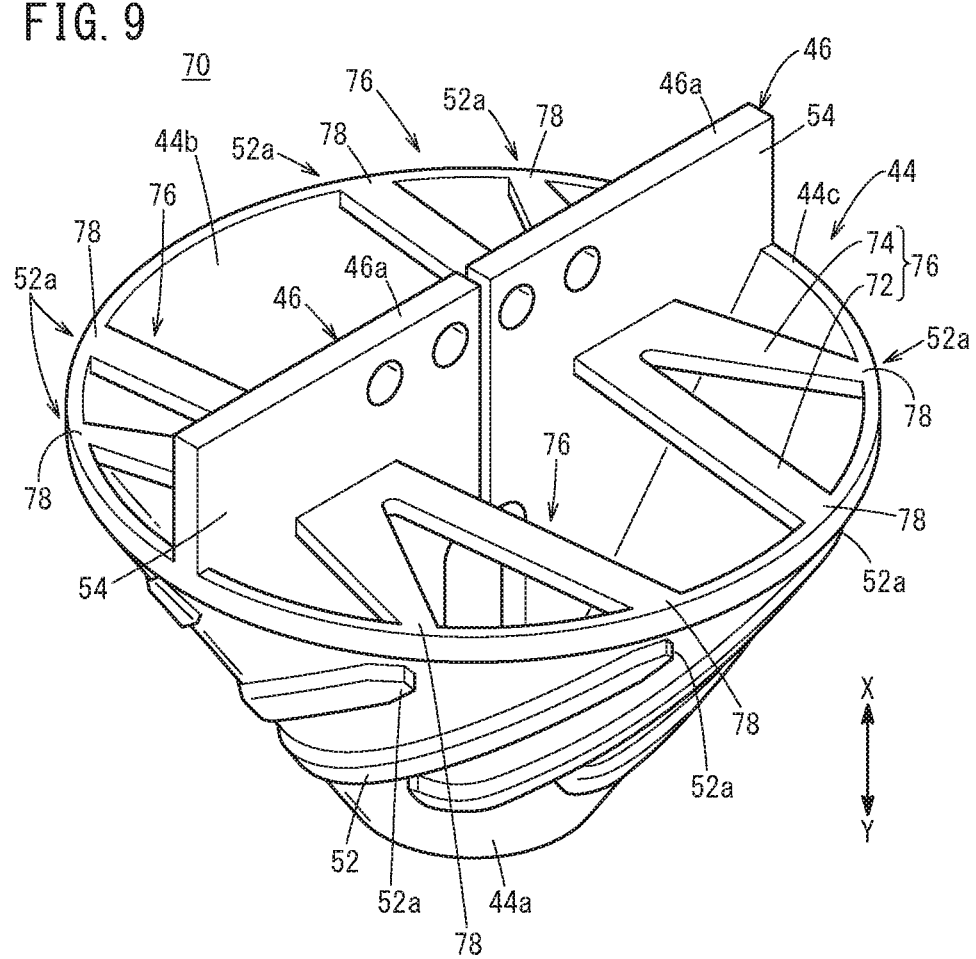
FIG. 9 is a perspective view of a heat chip according to a modified example.

The heat caulking device 10 may include a heat chip 70 shown in FIGS. 9 and 10, instead of the heat chip 34. Note that regarding the heat chip 70, configuring elements displaying functions and advantages the same as or similar to those of the heat chip 34 will be assigned with the same reference symbols as those assigned for the heat chip 34, and repeated descriptions thereof will be omitted.

The heat chip 70 includes a connecting section 76 which is configured from a main section 72 and a branch section 74. As shown in FIG. 9, an intersection point 78 of each main section 72 and branch section 74, and the edge section 44c on the one end surface side of the main body section 44 is provided in a vicinity of an end section 52a of the projection 52 arranged on the one end surface side of the main body section 44.

Specifically, as shown in FIG. 10, there are configured to be a total of four connecting section 76, that is, a pair of connecting sections 76 disposed sandwiching the terminal section 46 on one side (an arrow direction Z1 side of FIG. 10) in the radial direction of the main body section 44, and a pair of connecting sections 76 disposed sandwiching the terminal section 46 on the other side (an arrow direction Z2 side of FIG. 10) in the radial direction of the main body section 44. The main section 72 of each connecting section 76 extends along a space between the terminal section 46 and the edge section 44c of the main body section 44, so as to incline with respect to the radial direction of the main body section 44. The branch section 74 of each connecting section 76 extends in a direction of separating from the main section 72, as a point on the branch section 74 goes from a terminal section 46 side to the edge section 44c of the main body section 44, along the space between the terminal section 46 and the edge section 44c of the main body section 44.

When the heat chip 70 has been electrified, a resistance value gets smaller in the projection 52 proportionately to the thickness being larger there compared to that of another region of the heat chip 70, so the generated heat amount tends to be smaller. By disposition of the intersection point 78 with respect to this projection 52 being set as described above, it becomes possible for a current to be effectively supplied to the projection 52 via the connecting section 76. Therefore, occurrence of a difference in generated heat amount between the projection 52 and another region whose thickness is smaller than that of said projection 52 can be suppressed, so that heat can be generated substantially evenly in the whole of the heat chip 70. This makes it possible for the whole of the boss 24 to be favorably melted and deformed, and for the main plate 14 and the blades 16 to thereby be more highly strongly joined.

A shape, number, extending direction, and so on, of the connecting sections 48, 60, 62, 64, 66, 76 are not limited to those of the examples presented above, and a variety of forms may be adopted. For example, each of the connecting sections 48, 60, 62, 64, 66, 76 may be curved, not linear, or may be plate shaped, not bar shaped. Moreover, a configuration may be adopted in which, in the case of each of the connecting sections 48, 60, 62, 64, 66 too, similarly to in the case of the connecting section 76, their intersection point 78 with the edge section 44c on the one end surface side of the main body section 44 is provided in the vicinity of the end section 52a of the projection 52 arranged on the one end surface side of the main body section 44.

In the above-described embodiment, a configuration has been adopted in which the heat chip 34 and the connecting sections 48, 60, 62, 64, 66 are integrally formed from the same material as each other. However, they may be formed from different materials from each other.

The heat chip 34 of the heat caulking device 10 according to the above-described embodiment has been configured to include both the connecting section 48 and the projection 52. However, it may include either one only. Moreover, a shape of the projection 52 need only be appropriately set according to a shape of the hole 22, and is not limited to the above-described spirally extending projecting strip. Furthermore, the heat chip 34 including only the projection 52 is not limited to having its temperature raised by heating due to electrification, and may have its temperature raised by the likes of direct heating or induction heating. Whatever kind of heating method is used to heat the heat chip 34, it is possible for similar operational advantages to those of the above-described embodiment to be obtained.

The main plate 14 and the blades 16 may be configured from different materials from each other. Moreover, the main body and the boss 24 of the blade 16 may also be configured from different materials from each other. Furthermore, in the above-described embodiment, a configuration has been adopted in which the main plate 14 is provided with a plurality of the holes 22, and these holes 22 are provided so as to extend in a spiral from substantially the center section in the radial direction of the main plate 14, and in such a manner that said holes 22 are lined up at a certain interval in the circumferential direction of the main plate 14. However, the above-described embodiment is not specifically limited to these, and the shape, number, interval, and so on, of the hole 22 may be variously set.

In the heat caulking device 10 according to the above-described embodiment, joining has been performed by heat caulking in a state where one boss 24 that has been provided to each of a plurality of the blades 16 has been fitted into each of the holes 22 of the main plate 14. However, the above-described embodiment is not specifically limited to this. For example, one second member (not illustrated) provided with a plurality of the bosses and one first member (not illustrated) provided with a plurality of the holes may be joined by heat caulking. In this case, it becomes possible for joining strength to be even more favorably improved, without joining efficiency of the first member and the second member being lowered.

Moreover, although in the above-described embodiment, a heat caulking step by which the outer peripheral surface of the heat chip 34 is abutted on the bosses 24 to perform joining has been performed after performing a step by which the bosses 24 provided to the plurality blades 16 are fitted into the holes 22 of the main plate 14, these two steps may be performed simultaneously to achieve an improvement in cycle time.

Figure 11A:
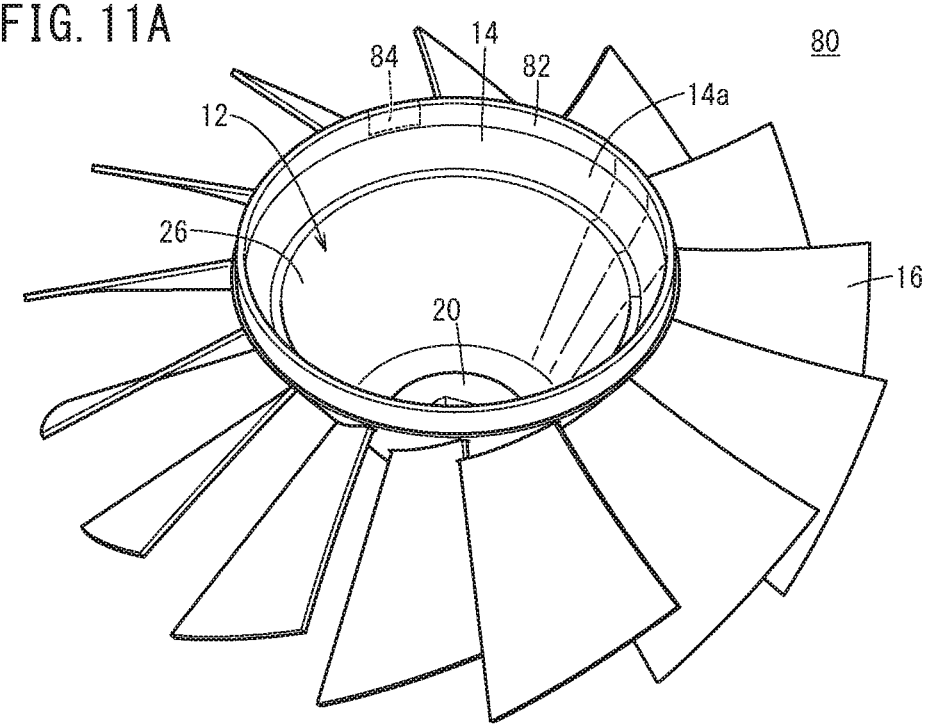
FIG. 11A is a perspective view of an impeller provided with an adjustment margin section.
Figure 11B:
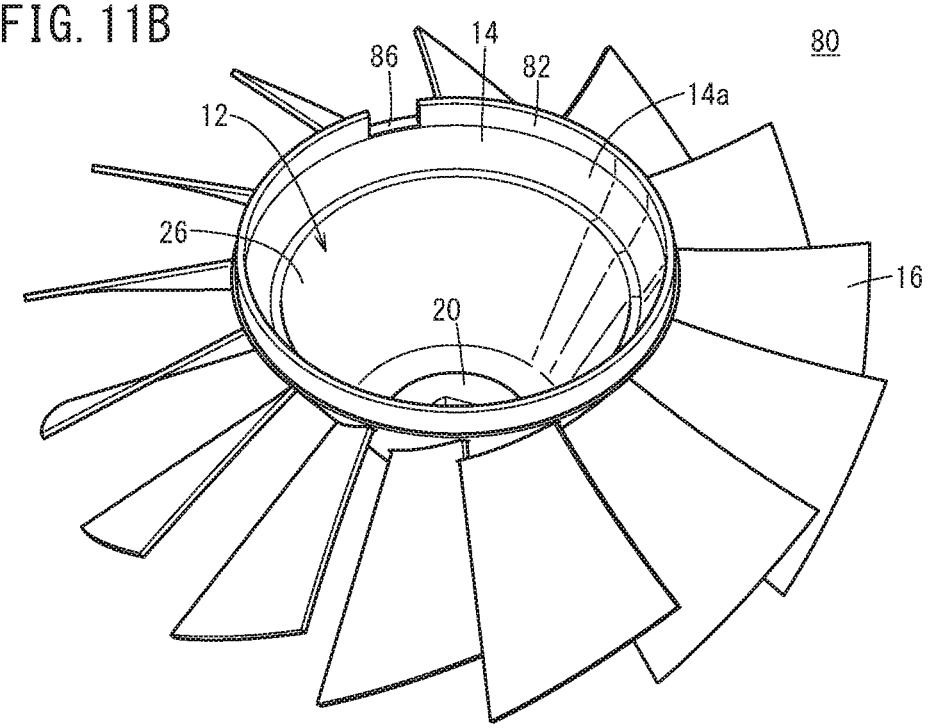
FIG. 11B is a perspective view of the impeller having a cutout formed in its adjustment margin section.

The heat caulking device 10 may obtain an impeller 80 shown in FIGS. 11A and 11B, instead of the impeller 18. The impeller 80 can be configured similarly to the impeller 18, apart from it further including an adjustment margin section 82. Therefore, regarding the impeller 80, configuring elements displaying functions and advantages the same as or similar to those of the impeller 18 will be assigned with the same reference symbols as those assigned for the impeller 18, and repeated descriptions thereof will be omitted.

The adjustment margin section 82 has a substantially cylindrical shape projecting along an axial direction of the main plate 14 from an end section on the one end surface side of said main plate 14, and can be integrally provided at, for example, a time of molding of the main plate 14, and so on. Moreover, an outer diameter of the adjustment margin section 82 is set so as to be smaller than an outer diameter on the one end surface side of the main plate 14. By thus setting a disposition or dimension of the adjustment margin section 82 with respect to the main plate 14, it becomes possible to provide the main plate 14 with the adjustment margin section 82, without affecting flow of fluid (fluid efficiency) occurring in the impeller 80.

In the impeller 80, there sometimes arises a need to adjust weight balance (rotation balance) of the impeller 80 overall, due to differences in weight of each of the blades 16, and so on. In such a case, a certain place that should be weight-lightened when adjusting the weight balance, like a removal place 84 surrounded by the broken line of FIG. 11A, for example, of the adjustment margin section 82 is removed as shown in FIG. 11B to form a cutout 86. This makes it possible to easily adjust the weight balance, without affecting the flow of fluid occurring in the impeller 80.

Note that in order to achieve further improvement in joining strength of the main plate 14 and the blades 16, an unillustrated projection may be provided on the inner peripheral surface 14a of the main plate 14. The projection is configured from a thermoplastic resin, for example, and is provided in a portion that, at a time of performing the heat caulking step, is faced by a low temperature section of the main body section 44, of the inner peripheral surface 14a of the main plate 14, or in a vicinity of said portion (hereafter, these portion and vicinity of said portion will also be collectively called a first portion). Note that the low temperature section is a portion that, when the main body section 44 has its temperature raised, is at a lower temperature than another region is, of the outer peripheral surface 44a of said main body section 44. Moreover, a portion at a higher temperature than another region is, of the outer peripheral surface 44a of the main body section 44, is also called a high temperature section. Furthermore, a portion faced by the high temperature section of the main body section 44, of the inner peripheral surface 14a of the main plate 14, or a vicinity of said portion will also be collectively called a second portion.

Providing the projection in this way results in that, at a time of the heat caulking step, molten resin of the boss 24 of the first portion facing the low temperature section flows into the second portion facing the high temperature section, so that even when resin of the first portion is lacking, the first portion can be supplemented by molten resin of the projection. As a result, the whole of the melted deformed section 26 can be formed so as to have substantially even volume, regardless of differences in generated heat amount of each portion of the main body section 44. As a result, it becomes possible to achieve further improvement in joining strength of the main plate 14

What is claim is:

1. A heat caulking device for joining a first member and a second member in such a manner that one or more bosses of the second member that, by being inserted in one or more holes penetrating the first member having a substantially conical hollow section, project from an inner peripheral surface of the first member toward the hollow section, are melted to join the first member and the second member, the heat caulking device comprising
   a heat chip that includes a substantially conical hollow main body section whose outer peripheral surface conforms to the inner peripheral surface of the first member,
   the outer peripheral surface of the main body section being provided with a projection that extends from a proximal end side of the main body section toward a distal end side of the main body section and projects toward the inner peripheral surface of the first member and is located in the vicinity of the hole.

2. The heat caulking device according to claim 1, wherein a plurality of the holes are provided so as to be lined up at intervals in a circumferential direction, and
   the projection projects toward a space between the holes.

3. The heat caulking device according to claim 2, wherein the hole extends in a spiral from a center side in a radial direction of the first member, and
   the projection extends along an extending direction of the hole, along a space between the holes.

4. A heat caulking device for joining a first member and a second member in such a manner that one or more bosses of the second member that, by being inserted in one or more holes penetrating the first member having a substantially conical hollow section, project from an inner peripheral surface of the first member toward the hollow section, are melted to join the first member and the second member, the heat caulking device comprising
   a heat chip that includes:
   a substantially conical hollow main body section whose peripheral length on one end surface side thereof is larger than a peripheral length on another end surface side thereof and whose outer peripheral surface conforms to the inner peripheral surface of the first member;
   a pair of terminal sections that project from an inner peripheral surface of the main body section toward an axial center of the main body section so as to face each other; and
   a connecting section that electrically connects the terminal section and an edge section on the one end surface side of the main body section.

5. The heat caulking device according to claim 4, wherein the outer peripheral surface of the main body section is provided with a projection that projects toward a vicinity of the hole of the inner peripheral surface of the first member.

6. The heat caulking device according to claim 5, wherein the projection has a projecting strip shape extending along a space between the one end surface side and the other end surface side of the main body section, and
   an intersection point of the edge section on the one end surface side of the main body section and the connecting section is provided in a vicinity of an end section on the one end surface side of the projection.

7. The heat caulking device according to claim 5, wherein a plurality of the holes are provided so as to be lined up at intervals in a circumferential direction, and
   the projection projects toward a space between the holes.

8. The heat caulking device according to claim 7, wherein
the hole extends in a spiral from a center side in a radial direction of the first member, and
the projection extends along an extending direction of the hole, along a space between the holes.

\* \* \* \* \*